United States Patent
Makino et al.

(10) Patent No.: US 9,017,082 B2
(45) Date of Patent: Apr. 28, 2015

(54) ELECTRICAL JUNCTION BOX

(71) Applicant: Yazaki Corporation, Tokyo (JP)

(72) Inventors: Masahiro Makino, Makinohara (JP); Kouji Ueyama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/087,274

(22) Filed: Nov. 22, 2013

(65) Prior Publication Data

US 2014/0154896 A1 Jun. 5, 2014

(30) Foreign Application Priority Data

Nov. 30, 2012 (JP) .................. 2012-262083

(51) Int. Cl.
*H01R 12/00* (2006.01)
*H02G 3/08* (2006.01)
*B60R 16/023* (2006.01)

(52) U.S. Cl.
CPC ............ *H02G 3/088* (2013.01); *B60R 16/0238* (2013.01)

(58) Field of Classification Search
USPC .............. 439/76.2, 457, 459, 949, 76.1, 535, 439/730; 361/752–753, 780, 810; 174/560–562, 520, 50, 17 R
See application file for complete search history.

(56) References Cited

U.S. PATENT DOCUMENTS

| | | | | |
|---|---|---|---|---|
| 8,425,262 B1* | 4/2013 | Hirasawa et al. | ............. | 439/701 |
| 8,449,316 B2* | 5/2013 | Chiba | ............ | 439/409 |
| 8,573,987 B1* | 11/2013 | Schweitzer et al. | ......... | 439/76.2 |
| 8,622,755 B2* | 1/2014 | Takeuchi et al. | ............. | 439/76.2 |
| 8,633,383 B2* | 1/2014 | Akahori et al. | ................. | 174/50 |
| 8,723,033 B2* | 5/2014 | Hara et al. | ....................... | 174/50 |
| 8,830,686 B2* | 9/2014 | Nomoto | ....................... | 361/752 |
| 2012/0267163 A1 | 10/2012 | Takeuchi et al. | | |

FOREIGN PATENT DOCUMENTS

JP 2012-228080 A 11/2012

* cited by examiner

*Primary Examiner* — Jean F Duverne
(74) *Attorney, Agent, or Firm* — Locke Lord LLP

(57) ABSTRACT

There is provided an electrical junction box which can prevent water from entering from an insertion portion for the long term and which can be assembled easily. The electrical junction box includes a frame, a lower cover and an insertion portion through which a bundle of electric wires is passed. The insertion portion includes an insertion portion first divided piece having a semicircular cross-section and integrally formed with the frame and an insertion portion second divided piece having a semicircular cross-section and integrally formed with the lower cover via a hinge portion. In an unloaded condition, the insertion portion second divided piece is positioned at a location farthest from the insertion portion first divided piece. The divided pieces are provided with binding band insertion portions through which a binding band is passed.

6 Claims, 7 Drawing Sheets

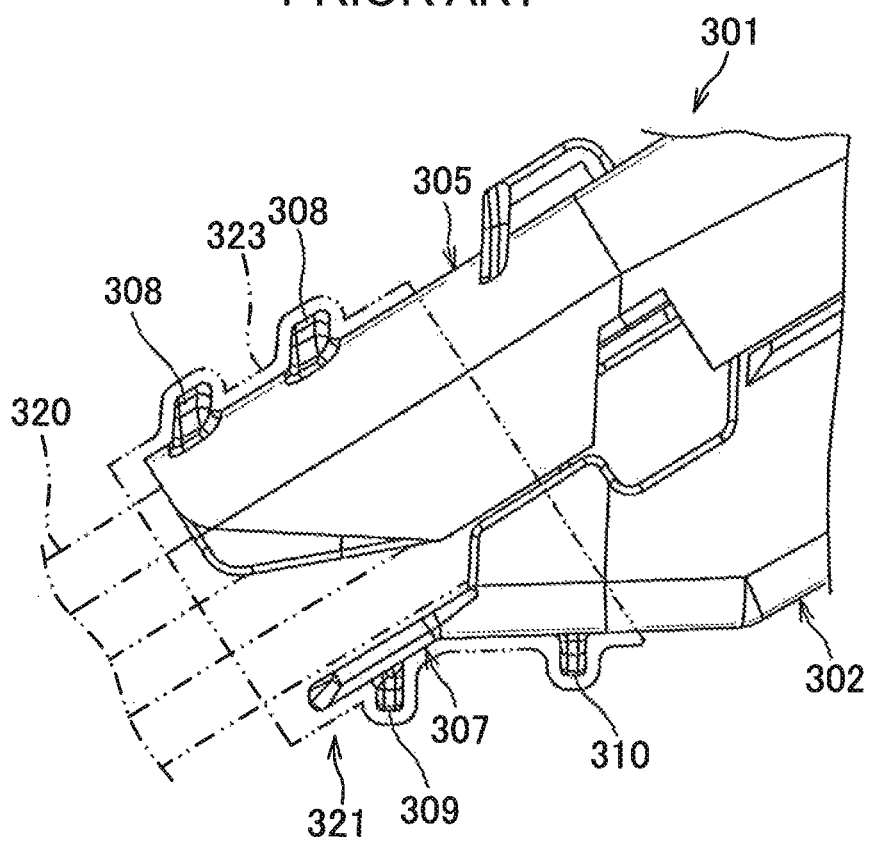

ELECTRICAL JUNCTION BOX

CROSS-REFERENCE TO RELATED APPLICATIONS

This application is on the basis of Japanese Patent Application No. 2012-262083 filed on Nov. 30, 2012, the contents of which are hereby incorporated by reference.

TECHNICAL FIELD

The present invention relates to an electrical junction box to be mounted on a motor vehicle.

BACKGROUND ART

There are various structures for an electrical junction box to be mounted on a motor vehicle. One example of such electrical junction box is shown in FIG. 7 and includes a frame 301 to which a component is attached, a lower cover 302 attached to the frame 301 and an insertion portion 321 through which a bundle of electric wires 320 is passed (refer to PTL 1).

The insertion portion 321 is formed with a gutter-shaped insertion portion first divided piece 305 protruding obliquely downward from a side wall of the frame 301 and a gutter-shaped insertion portion second divided piece 307 protruding obliquely downward from a bottom wall of the lower cover 302. An outer surface of the insertion portion first divided piece 305 and an outer surface of the insertion portion second divided piece 307 are provided with ribs 308, 309, 310 for preventing displacement of a tape.

When assembling the electrical junction box described above, the bundle of electric wires 320 is fixed to the insertion portion first divided piece 305 by a banding band, and in this condition, the lower cover 302 is attached to the frame 301. By doing so, the bundle of electric wires 320 is positioned between the insertion portion first divided piece 305 and the insertion portion second divided piece 307. Then, a tape 323 is wound around an outer circumference of the insertion portion 321 and an outer circumference of the bundle of electric wires 320 to prevent water from entering between the insertion portion 321 and the bundle of electric wires 320.

CITATION LIST

Patent Literature

PTL 1: Japan Patent Application Publication No. 2012-228080

SUMMARY OF INVENTION

Problem to be Solved

However, the electrical junction box shown in FIG. 7 has problems as described below. That is, the electrical junction box described above is arranged to prevent water from entering between the insertion portion 321 and the bundle of electric wires 320 by winding the tape 323 on the outer circumference of the insertion portion 321 and on the outer circumference of the bundle of electric wires 320; however, the tape 323 could be peeled off during a long-term use of the electrical junction box, and thus the waterproof function cannot be maintained for a long term. In addition to that, the insertion portion 321 requires a portion for winding the tape 323, causing an increase in size of the junction box.

Furthermore, in the electrical junction box described above, the bundle of electric wires 320 is fixed to the insertion portion first divided piece 305 by the binding band prior to winding the tape, and thus the bundle of electric wires 320 and the insertion portion first divided piece 305 having the angled shape are fastened together. Thus, there is a problem that the bundle of electric wires 320 is easily displaced with respect to the insertion portion first divided piece 305 even when the bundle of electric wires 320 is fixed by the banding band. Also, this displacement of the bundle of electric wires 320 is one of the causes of the peeling off of the tape 323.

The present invention aims to solve the above-mentioned problems. Thus, an object of the present invention is to provide an electrical junction box which can prevent water from entering from an insertion portion for a long term and which can be assembled easily.

Solution to Problem

In order to achieve the above-described object, the present invention provides, in a first aspect, an electrical junction box including: a frame to which a component is attached; a cover arranged to be attached to the frame; and an insertion portion through which a bundle of electric wires is passed, wherein the insertion portion includes an insertion portion first divided piece integrally formed with the frame and protruding outside the frame, and an insertion portion second divided piece integrally formed with the cover via an elastically-deformable hinge portion and protruding outside the cover, the insertion portion second divided piece being arranged to locate the bundle of electric wires between the insertion portion first divided piece and the insertion portion second divided piece, wherein the insertion portion second divided piece is allowed to be displaced according to a thickness of the bundle of electric wires being used and positioned along the bundle of electric wires, wherein the insertion portion first divided piece and the insertion portion second divided piece are provided with binding band insertion portions through which a binding band is passed, the binding band being arranged to fasten the insertion portion first divided piece and the insertion portion second divided piece and the bundle of electric wires together, wherein the insertion portion second divided piece is arranged such that under a condition in which the insertion portion second divided piece is unloaded, the insertion portion second divided piece is positioned at a location farthest from the insertion portion first divided piece, and wherein in a condition in which the cover is attached to the frame and the insertion portion second divided piece is unloaded, when the binding band is passed through the binding band insertion portion to be passed through first, the binding band is guided to the next binding band insertion portion and is passed through all of the binding band insertion portions.

According to a second aspect, the binding band insertion portions are formed such that inner sizes of the binding band insertion portions in a widthwise direction of the binding band are arranged to decrease in order of passage of the biding band.

According a third aspect, the electrical junction box is assembled by attaching the cover to the frame under a condition in which the bundle of electric wires is positioned along the insertion portion first divided piece, passing the binding band through all of the binding band insertion portions under the condition in which the insertion portion second divided piece is unloaded, and then positioning the insertion portion second divided piece along the bundle of electric wires and fastening the insertion portion first divided piece and the insertion portion second divided piece and the bundle of electric wires together.

According to a fourth aspect, the insertion portion first divided piece is provided with a second binding band insertion portion through which a second binding band is passed, the second binding band being arranged to fasten the insertion portion first divided piece and the bundle of electric wires together, and prior to attaching the cover to the frame, the bundle of electric wires is fixed to the insertion portion first divided piece by the second binding band.

Advantageous Effects of Invention

As explained above, according to the invention described in the first aspect, the insertion portion second divided piece can be displaced according to the thickness of the bundle of electric wires being used and positioned along the bundle of electric wires. Thus, the insertion portion and the bundle of electric wires can be closely-attached to each other, thereby preventing water from entering from between the insertion portion and the bundle of electric wires. Consequently, there is no need to provide a tape which is used conventionally, and thus there is no need to provide a portion for winding the tape to the insertion portion, thereby downsizing the insertion portion. Furthermore, unlike the tape, the binding band fastening the insertion portion first divided piece and the insertion portion second divided piece and the bundle of electric wires together cannot be peeled off, thereby preventing water from entering from between the insertion portion and the bundle of electric wires for the long term. Furthermore, in the condition in which the cover is attached to the frame and the insertion portion second divided piece is unloaded, when the binding band is passed through the binding band insertion portion to be passed through first, the binding band is guided to the next binding band insertion portion and is passed through all of the binding band insertion portions. Consequently, the insertion of the binding band can be facilitated. Thus, there is provided the electrical junction box which can prevent water from entering from the insertion portion for the long term and which can be assembled easily.

As explained above, according to the invention described in the second aspect, the binding band insertion portions are formed such that the inner sizes of the binding band insertion portions in the widthwise direction of the binding band are arranged to decrease in order of passage of the biding band. Consequently, the insertion workability of the binding band is not decreased, and in the condition in which the bundle of electric wires is fixed, the binding band can be prevented from being displaced.

As explained above, according to the invention described in the third aspect, the electrical junction box is assembled by attaching the cover to the frame under the condition in which the bundle of electric wires is positioned along the insertion portion first divided piece, passing the binding band through all of the binding band insertion portions under the condition in which the insertion portion second divided piece is unloaded, and then positioning the insertion portion second divided piece along the bundle of electric wires and fastening the insertion portion first divided piece and the insertion portion second divided piece and the bundle of electric wires together. Consequently, the takt time can be reduced, thereby reducing the production cost.

As explained above, according to the invention described in the fourth aspect, the insertion portion first divided piece is provided with the second binding band insertion portion through which a second binding band is passed, the second binding band being arranged to fasten the insertion portion first divided piece and the bundle of electric wires together, and prior to attaching the cover to the frame, the bundle of electric wires is fixed to the insertion portion first divided piece by the second binding band. Consequently, the insertion portion and the bundle of electric wires can be further closely attached to each other. Thus, the work for attaching the cover to the frame and the work for fastening the insertion portion first divided piece and the insertion portion second divided piece and the bundle of electric wires using the binding band can be facilitated.

BRIEF DESCRIPTION OF DRAWINGS

FIG. 7 is a side view of an insertion portion provided to a conventional electrical junction box.

DESCRIPTION OF EXEMPLARY EMBODIMENTS

In the following, an electrical junction box according to one embodiment of the present invention is explained in reference to FIGS. 1 through 6. The electrical junction box of the present invention may be mounted on a motor vehicle to supply power and transmit signal to an electronic device mounted on the motor vehicle.

Figure 1:
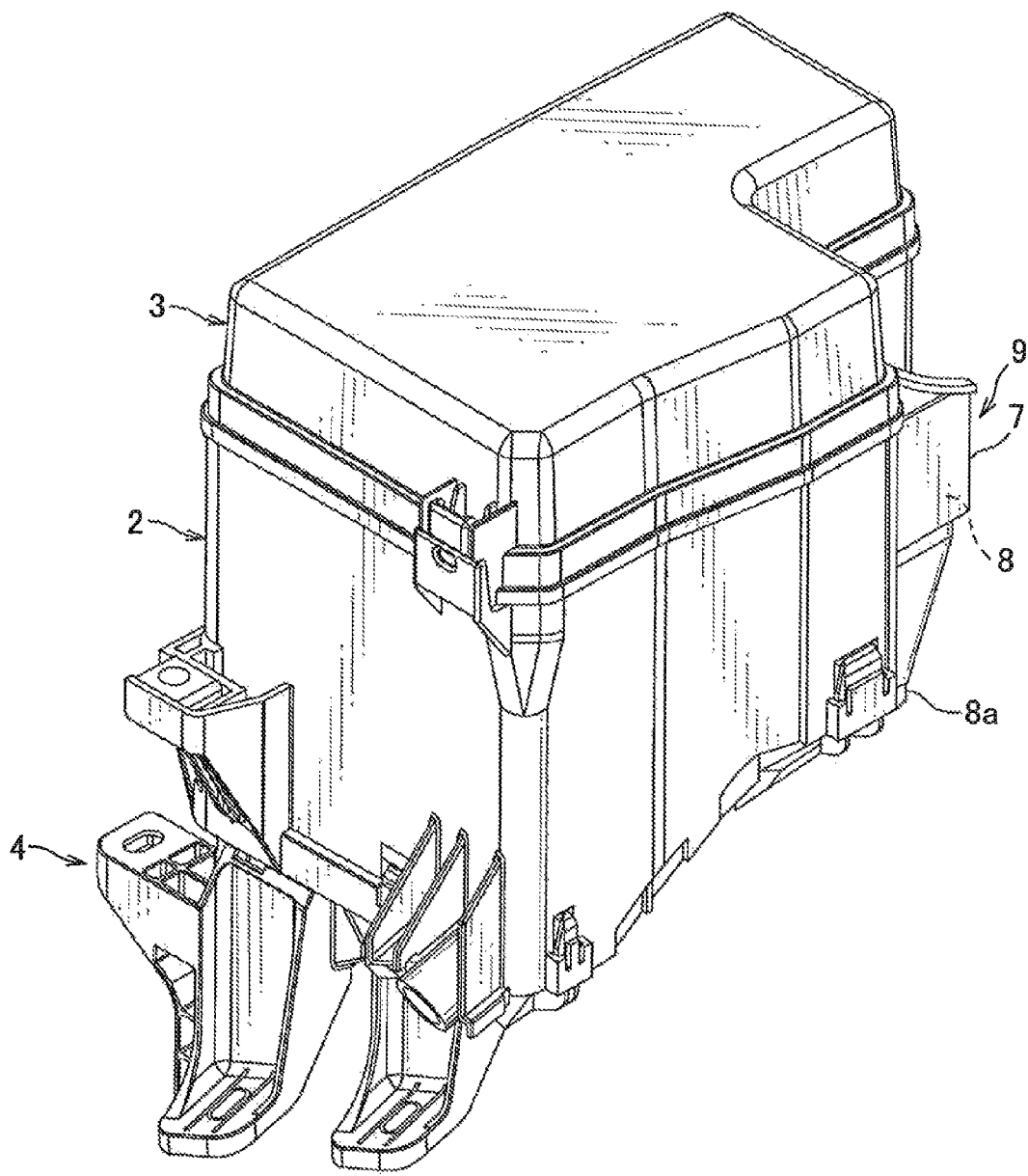
FIG. 1 is a perspective view of an electrical junction box according to one embodiment of the present invention.
Figure 2:
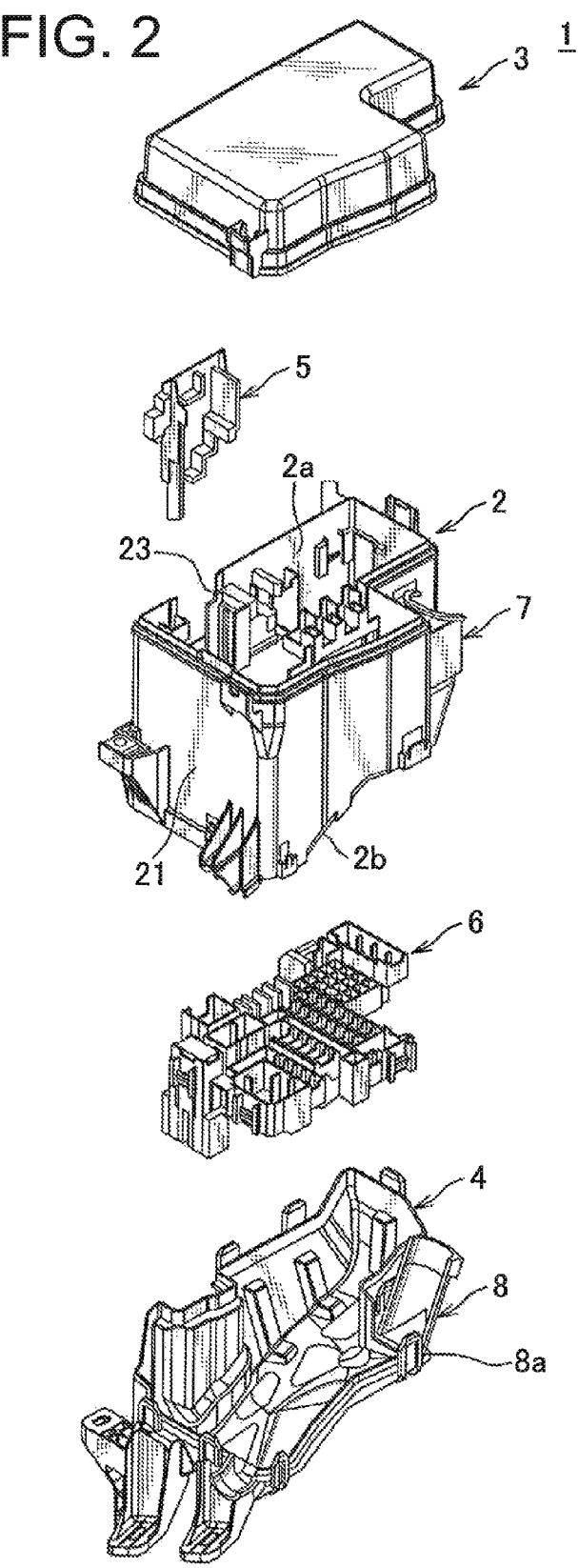
FIG. 2 is an exploded view of the electrical junction box shown in FIG. 1.

As shown in FIG. 1 and FIG. 2, an electrical junction box 1 includes a frame 2 having a frame-like peripheral wall 21, a cassette block 6 attached to inside of the frame 2, a plurality of components attached to the cassette block 6, a side cover 5 attached to the frame 2 so as to cover a cutout 23 formed by cutting out a portion of the peripheral wall 21, an upper cover 3 attached to an upper face 2a of the frame 2, a lower cover 4 (which corresponds to "cover" described in claims) attached to a lower face 2b of the frame 2, and an insertion portion 9 through which a bundle of electric wires W is passed. The frame 2, the cassette block 6, the side cover 5, the upper cover 3 and the lower cover 4 are made of synthetic resin.

In this embodiment, the frame 2 and the cassette block 6 are separate parts; however, the cassette 6 may be integrally formed with the frame 2.

Figure 3:
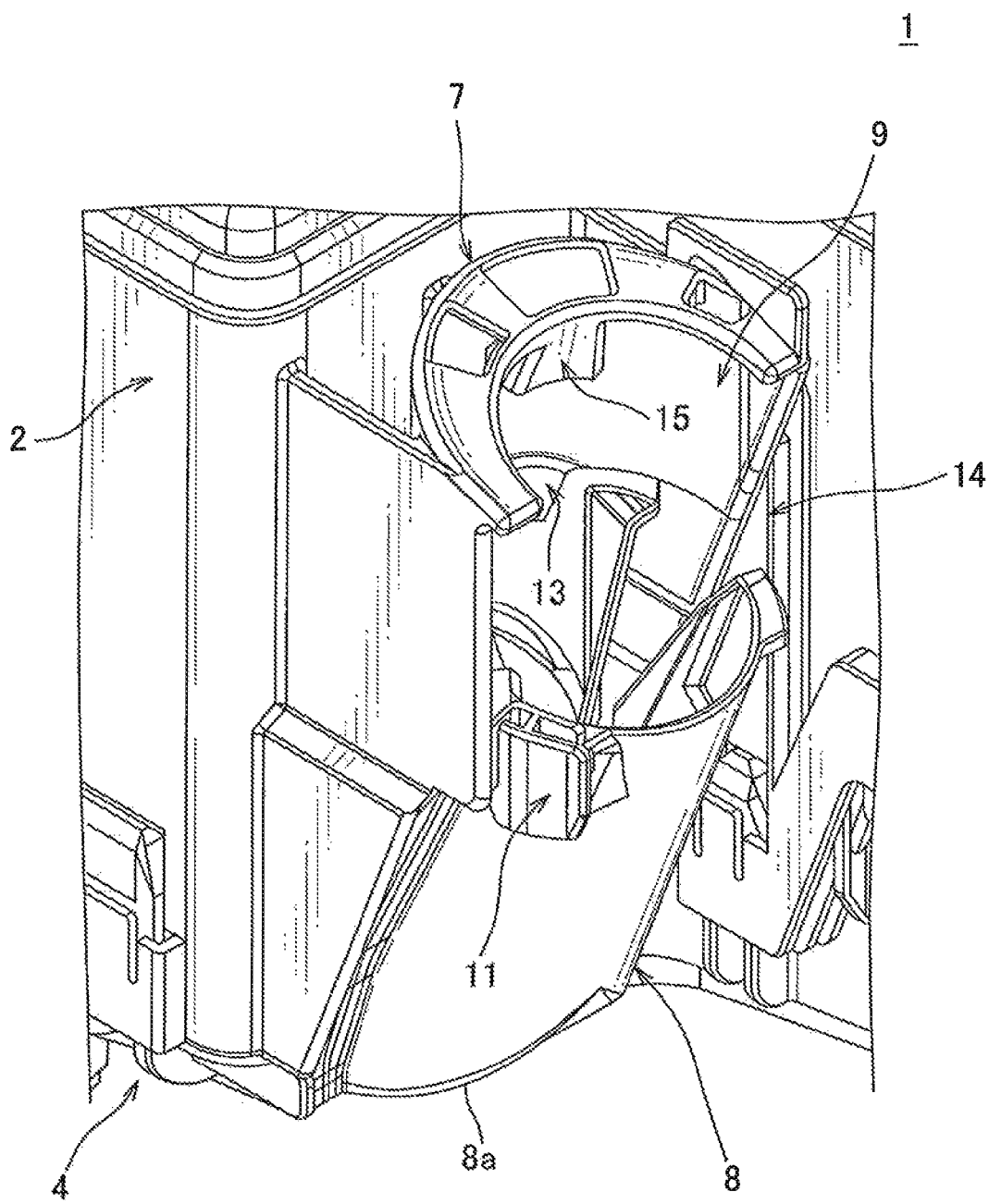
FIG. 3 is an enlarged view of an insertion portion shown in FIG. 1.
Figure 4:
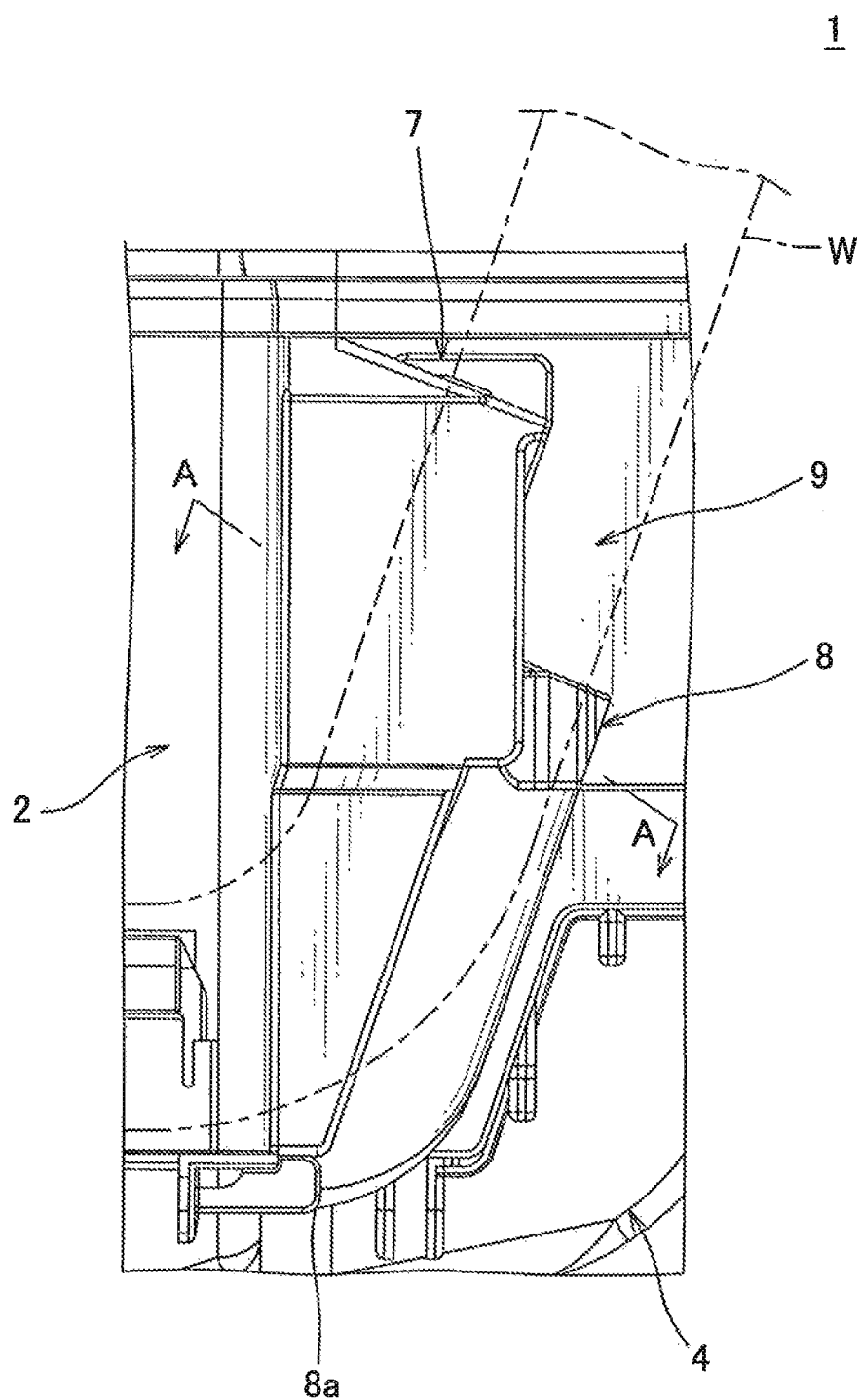
FIG. 4 is a side view of the insertion portion shown in FIG. 3.

As shown in FIG. 3 and FIG. 4, the insertion portion 9 includes an insertion portion first divided piece 7 integrally formed with the frame 2 and protruding to an outside of the frame 2, i.e. an outside of the peripheral wall 21, and an insertion portion second divided piece 8 integrally formed with the lower cover 4 via an elastically deformable hinge portion 8a, the insertion portion second divided piece 8 protruding to an outside of the lower cover 4 and being arranged so as to position the bundle of electric wires W between the insertion portion first divided piece 7 and the insertion portion second divided piece 8. The insertion portion first divided piece 7 and the insertion portion second divided piece 8 have a semicircular cross-section. The hinge portion 8a is a selfhinge which is formed thinner than other portions. The bundle of electric wires W is formed by bundling electric wires electrically-connected to the components attached to the cassette block 6.

In use, the insertion portion second divided piece 8 is displaced about the hinge portion 8*a* according to the thickness of the bundle of electric wires W being used and positioned along the bundle of electric wires W. The insertion portion first divided piece 7 is arranged such that the positional relationship between the insertion portion first divided piece 7 and the peripheral wall 21 is maintained constant, i.e. the insertion portion first divided piece 7 is not displaced. The insertion portion second divided piece 8 is formed such that, in an unloaded condition (i.e. a natural condition), the insertion portion second divided piece 8 is positioned at a location farthest from the insertion portion first divided piece 7.

Figure 5:
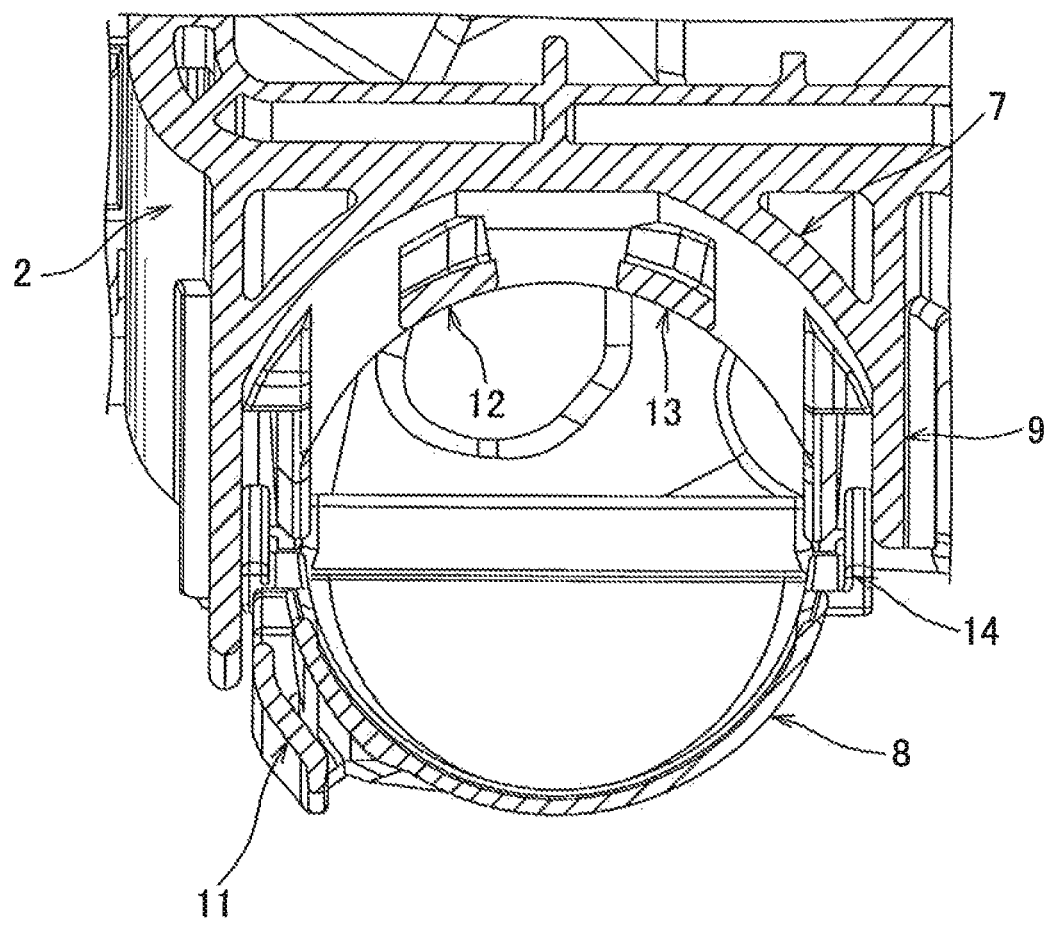
FIG. 5 is a cross-sectional view taken long a line A-A of the insertion portion shown in FIG. 4.
Figure 6:
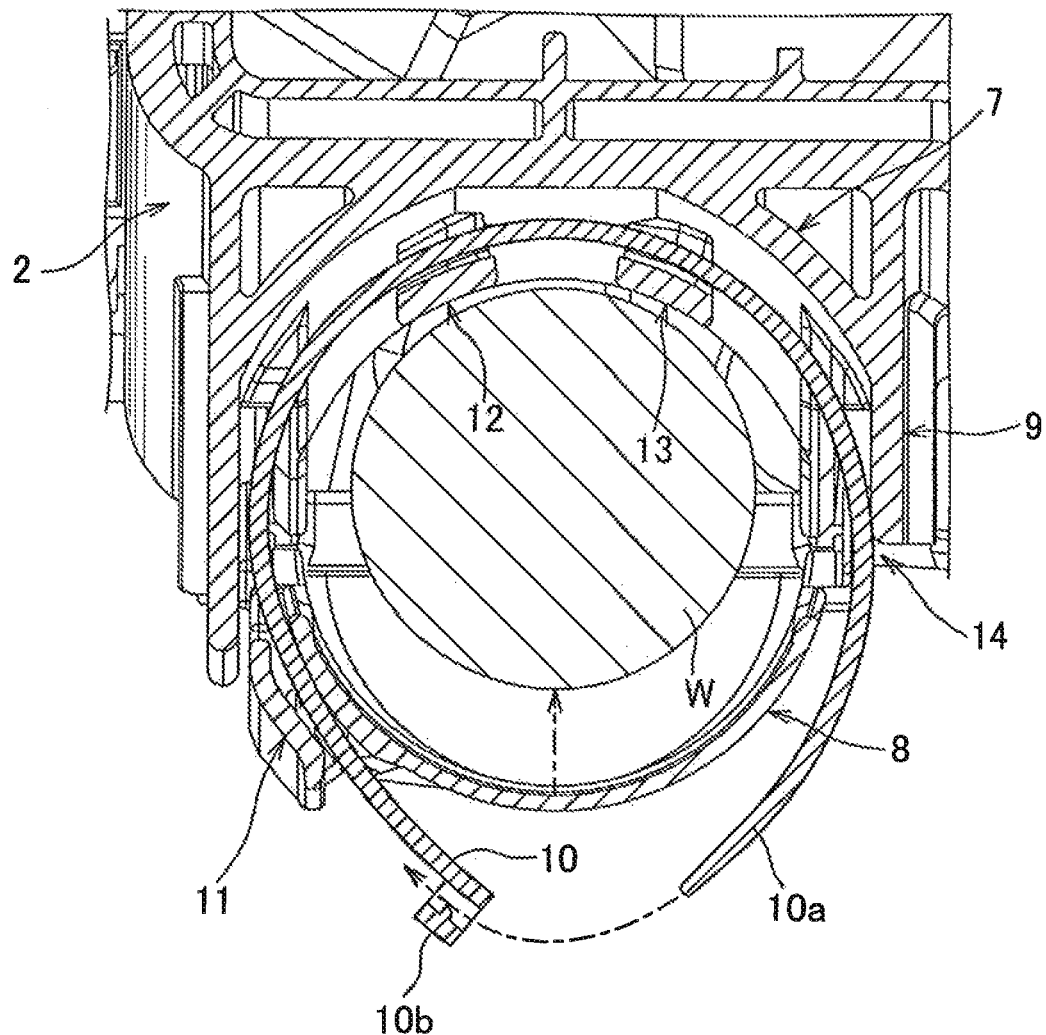
FIG. 6 is a cross-sectional view showing a binding band being passed through a binding band insertion portion shown in FIG. 5.

As shown in FIG. 5 and FIG. 6, the insertion portion first divided piece 7 and the insertion portion second divided piece 8 are provided with binding band insertion portions 11, 12, 13 through which the binding band 10 for fastening the insertion portion first divided piece 7 and the insertion portion second divided piece 8 and the bundle of electric wires W together is passed. The binding band 10 is a well-known binding band and includes a band-like band portion 10*a* and a band fixation portion 10*b* provided at one end of the band portion 10*a*. The binding band insertion portion 11 is provided at one circumferential end at an outer surface of the insertion portion second divided piece 8. The binding band insertion portions 12, 13 are provided at an inner surface of the insertion portion first divided piece 7 and arranged with a space between each other.

As shown in FIG. 6, in a condition in which the lower cover 4 is attached to the frame 2 and the insertion portion second divided piece 8 is unloaded, the band portion 10*a* of the binding band 10 is passed, in a clockwise fashion, through the binding band insertion portion 11 (which corresponds to "binding band insertion portion to be passed through first" described in claims), by which a distal end of the band portion 10*a* is positioned in a space between the insertion portion first divided piece 7 and the insertion portion second divided piece 8. By further inserting the band portion 10*a* in this condition, the distal end of the band portion 10*a* abuts on the inner surface of the insertion portion first divided piece 7 and thus guided to the binding band insertion portion 13. Then, the distal end of the band portion 10*a* passed through the binding band insertion portion 13 is passed through an exit 14 located between the one circumferential end of the insertion portion second divided piece 8 and an end of the insertion portion first divided piece 7 and comes out from the space between the insertion portion first divided piece 7 and the insertion portion second divided piece 8.

The distal end of the band portion 10*a* which has come out in a manner described above is then passed through the band fixation portion 10*b*, and then the insertion portion second divided piece 8 is displaced toward the insertion portion first divided piece 7 and positioned along the bundle of electric wires W and the distal end of the band portion 10*a* is drawn out from the band fixation portion 10*b*, thereby fastening the insertion portion first divided piece 7 and the insertion portion second divided piece 8 and the bundle of electric wires W together. As a result, the insertion portion 9 and the bundle of electric wires W are fixed to each other in a closely-attached fashion.

As described above, in the insertion portion 9, the positions of the respective binding band insertion portions 11, 12, 13 and the curvatures of the insertion portion first divided piece 7 and the insertion portions second divided piece 8 are adjusted such that, in the condition in which the lower cover 4 is attached to the frame 2 and the insertion portion second divided piece 8 is unloaded, when the binding band 10 is passed through said binding band insertion portion 11 to be passed through first, the binding band 10 is guided to the next binding band insertion portion 12 and is passed through all of the binding band insertion portions 11, 12, 13. Consequently, the insertion of the binding band 10 can be achieved easily without supporting the insertion portion second divided piece 8. In addition, in a condition in which the insertion portion second divided piece 8 is displaced toward the insertion portion first divided piece 7, the binding band 10 cannot be passed through all of the binding band insertion portions 11, 12, 13.

Furthermore, the binding band insertion portions 11, 12, 13 are formed such that, the inner sizes thereof in the widthwise direction of the binding band 10 are arranged to decrease in order of passage of the biding band 10. Consequently, the insertion workability of the binding band 10 is not decreased, and in the condition in which the bundle of electric wires W is fixed, the binding band 10 can be prevented from being displaced in the longitudinal direction of the bundle of electric wires W.

Moreover, the inner surface of the insertion portion first divided piece 7 is provided with a second binding band insertion portion 15 (FIG. 3) through which a second binding band (not shown) for fastening the insertion portion first divided piece 7 and the bundle of electric wires W together is passed. As shown in FIG. 3, the second binding band insertion portion 15 is provided at a location more distant from the peripheral wall 21 than the binding band insertion portions 12, 13.

Next, the assembling procedure of the above-described electrical junction block 1 is explained. Firstly, the cassette block 6 is attached to the frame 2, and then various components are attached to the cassette block 6. Then, the side cover 5 and the upper cover 3 are attached to the frame 2. Next, before attaching the lower cover 4 to the frame 2, the bundle of electric wires W is fixed to the insertion portion first divided piece 7 by the second binding band, and in this condition, the lower cover 4 is attached to the frame 2. Then, as described above, in the condition in which the insertion portion second divided piece 8 is unloaded, the binding band 10 is passed through all of the binding band insertion portions 11, 12, 13, and the insertion portion second divided piece 8 is positioned along the bundle of electric wires W, thereby fastening the insertion portion first divided piece 7 and the insertion portion second divided piece 8 and the bundle of electric wires W together by the binding band 10. By doing so, the electrical junction box 1 is assembled.

According to the electrical junction box 1 described above, the insertion portion 9 and the bundle of electric wires W can be closely-attached to each other, thereby preventing water from entering from between the insertion portion 9 and the bundle of electric wires W. Consequently, there is no need to provide a tape which is used conventionally, and thus there is no need to provide a portion for winding the tape to the insertion portion 9, thereby downsizing the insertion portion 9. Furthermore, unlike the tape, the binding band 10 fastening the insertion portion first divided piece 7 and the insertion portion second divided piece 8 and the bundle of electric wires W together cannot be peeled off, thereby preventing water from entering from between the insertion portion 9 and the bundle of electric wires W for the long term. Furthermore, in the electrical junction box 1, not only there is no need to provide a tape around the insertion portion 9, the insertion of the binding band 10 can be facilitated, as explained above. Thus, takt time can be reduced, thereby reducing the production cost.

In the embodiment described above, to improve the assembling efficiency and to further closely-attaching the insertion portion 9 and the bundle of electric wires W to each other, the bundle of electric wires W is fixed to the insertion portion first divided piece 7 using the second binding band before attaching the lower cover 4 to the frame 2. However, in the present invention, it is not necessary to provide the second binding band insertion portion 15 at the insertion portion first divided piece 7 to fix the bundle of electric wires W to the insertion portion first divided piece 7 using the second binding band, thus this structure may be omitted.

The embodiments described herein are only representative embodiments of the present invention, and the present invention is not limited to these. That is, the present invention can be modified and implemented in various ways without departing from the gist of the present invention.

REFERENCE SIGN LIST 1 electrical junction box
2 frame
4 lower cover (cover)
7 insertion portion first divided piece
8 insertion portion second divided piece
8a hinge portion
9 insertion portion
10 binding band
11, 12, 13 binding band insertion portion
W bundle of electric wires

The invention claimed is:

1. An electrical junction box comprising:
a frame to which a component is attached;
a cover arranged to be attached to the frame; and
an insertion portion through which a bundle of electric wires is passed,
wherein the insertion portion includes
an insertion portion first divided piece integrally formed with the frame and protruding outside the frame, and
an insertion portion second divided piece integrally formed with the cover via an elastically-deformable hinge portion and protruding outside the cover, the insertion portion second divided piece being arranged to locate the bundle of electric wires between the insertion portion first divided piece and the insertion portion second divided piece,
wherein the insertion portion second divided piece is arranged to be displaced according to a thickness of the bundle of electric wires being used and positioned along the bundle of electric wires,
wherein the insertion portion first divided piece and the insertion portion second divided piece are provided with binding band insertion portions through which a binding band is passed, the binding band being arranged to fasten the insertion portion first divided piece and the insertion portion second divided piece and the bundle of electric wires together,
wherein the insertion portion second divided piece is arranged is arranged such that, under a condition in which the insertion portion second divided piece is unloaded, the insertion portion second divided piece is positioned at a location farthest from the insertion portion first divided piece, and
wherein in a condition in which the cover is attached to the frame and the insertion portion second divided piece is unloaded, when the binding band is passed through the binding band insertion portion to be passed through first, the binding band is guided to the next binding band insertion portion and is passed through all of the binding band insertion portions.

2. The electrical junction box according to claim 1, wherein the binding band insertion portions are formed such that inner sizes of the binding band insertion portions in a widthwise direction of the binding band are arranged to decrease in order of passage of the biding band.

3. The electrical junction box according to claim 1, wherein the electrical junction box is assembled by
attaching the cover to the frame under a condition in which the bundle of electric wires is positioned along the insertion portion first divided piece,
passing the binding band through all of the binding band insertion portions under the condition in which the insertion portion second divided piece is unloaded, and then
positioning the insertion portion second divided piece along the bundle of electric wires and fastening the insertion portion first divided piece and the insertion portion second divided piece and the bundle of electric wires together.

4. The electrical junction box according to claim 3,
wherein the insertion portion first divided piece is provided with a second binding band insertion portion through which a second binding band is passed, the second binding band being arranged to fasten the insertion portion first divided piece and the bundle of electric wires together, and
wherein prior to attaching the cover to the frame, the bundle of electric wires is fixed to the insertion portion first divided piece by the second binding band.

5. The electrical junction box according to claim 2, wherein the electrical junction box is assembled by
attaching the cover to the frame under a condition in which the bundle of electric wires is positioned along the insertion portion first divided piece,
passing the binding band through all of the binding band insertion portions under the condition in which the insertion portion second divided piece is unloaded, and then
positioning the insertion portion second divided piece along the bundle of electric wires and fastening the insertion portion first divided piece and the insertion portion second divided piece and the bundle of electric wires together.

6. The electrical junction box according to claim 5,
wherein the insertion portion first divided piece is provided with a second binding band insertion portion through which a second binding band is passed, the second binding band being arranged to fasten the insertion portion first divided piece and the bundle of electric wires together, and
wherein prior to attaching the cover to the frame, the bundle of electric wires is fixed to the insertion portion first divided piece by the second binding band.

* * * * *